United States Patent [19]

Walter

[11] 4,397,073
[45] Aug. 9, 1983

[54] METHOD FOR ASSEMBLING CONTAINER HALVES

[75] Inventor: John Walter, Evergreen Park, Ill.

[73] Assignee: The Continental Group, Inc., New York, N.Y.

[21] Appl. No.: 200,309

[22] Filed: Oct. 24, 1980

Related U.S. Application Data

[62] Division of Ser. No. 40,354, May 18, 1979, abandoned.

[51] Int. Cl.³ .............................................. B23P 11/02
[52] U.S. Cl. ........................................ 29/446; 29/458; 29/525
[58] Field of Search ............... 29/446, 525, 458, 235, 29/450, 801, 282, 237, 296, 797, 451; 156/165, 423, 198, 294; 220/3, 76; 493/108

[56] References Cited

U.S. PATENT DOCUMENTS

| | | | |
|---|---|---|---|
| 1,218,907 | 3/1917 | Shevlir | 29/451 UX |
| 1,929,275 | 10/1933 | Eudaly et al. | 29/450 UX |
| 3,018,914 | 1/1962 | Webster | 220/3 |
| 3,346,435 | 10/1967 | Beck | 156/423 |
| 3,462,825 | 8/1969 | Pope et al. | 29/451 |
| 3,709,757 | 1/1973 | Sturley | 156/293 X |
| 3,828,412 | 8/1974 | Dreksler | 29/458 X |
| 4,041,599 | 8/1977 | Smith | 29/458 X |
| 4,124,928 | 11/1978 | Stark | 29/451 X |
| 4,127,431 | 11/1978 | Susnjara | 156/293 X |
| 4,190,479 | 2/1980 | Smith | 29/458 X |

*Primary Examiner*—Charlie T. Moon
*Attorney, Agent, or Firm*—John J. Kowalik; Charles E. Brown

[57] ABSTRACT

Apparatus and method for assembling a pair of thin-walled metal container counterparts which are brought together axially, are rounded and one inserted into the other substantially without deformation of either of the pair of counterparts so that the inner part is allowed to expand, after insertion, radially and both parts at their juncture are stressed in hoop tension for tightly embracing an adhesive interposed therebetween and thereby insure a good bond at the seam.

6 Claims, 5 Drawing Figures

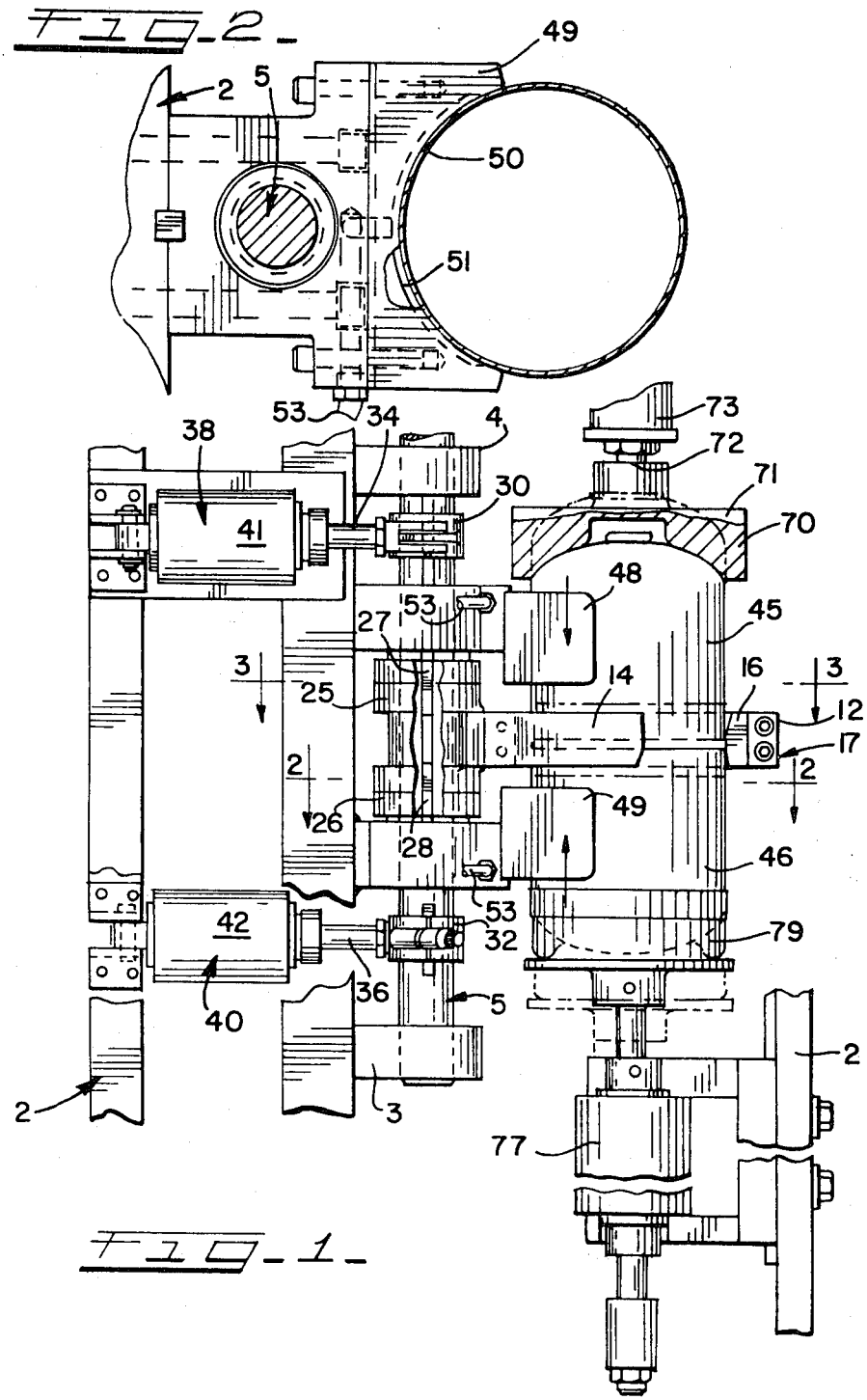

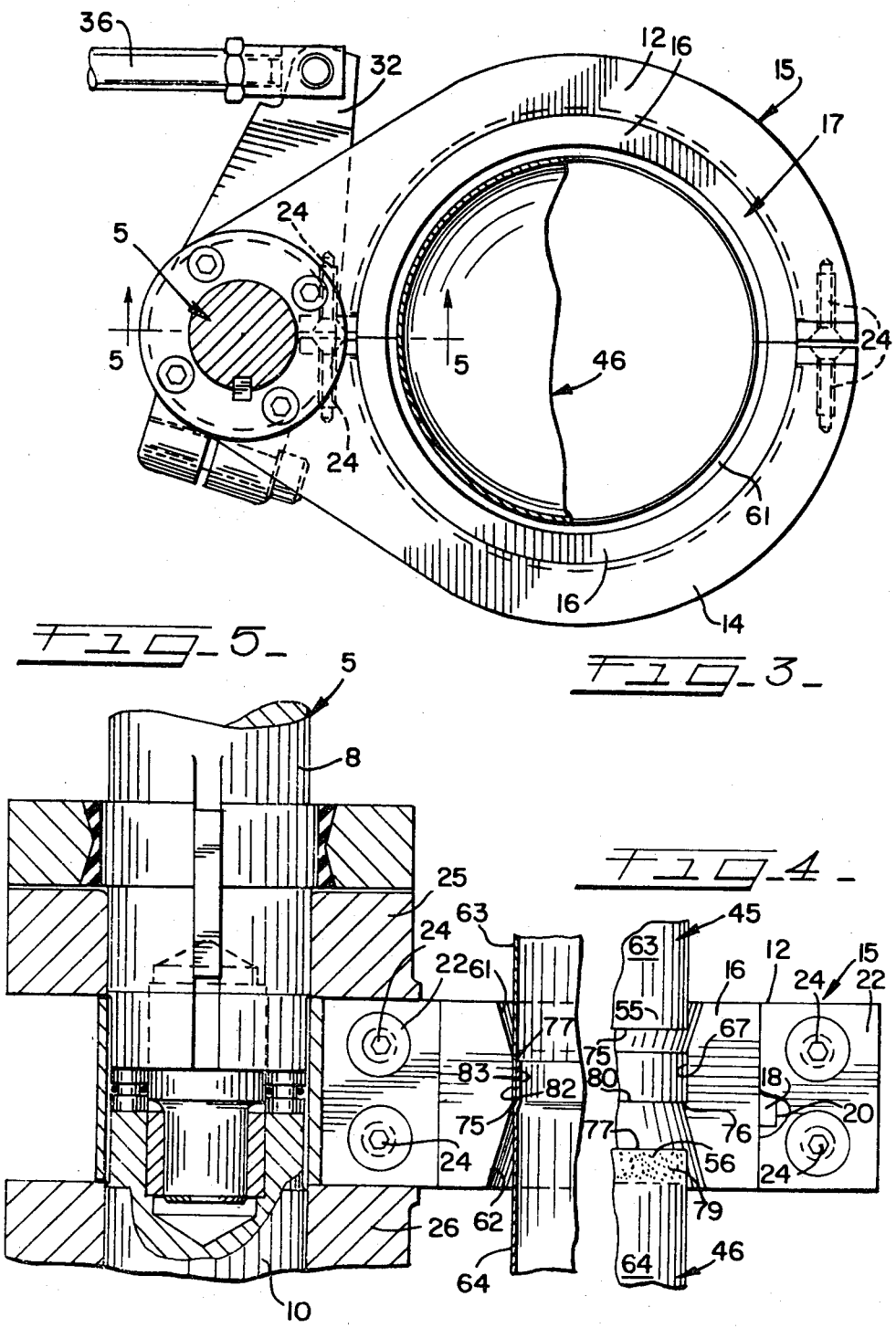

METHOD FOR ASSEMBLING CONTAINER HALVES

This application is a division of application Ser. No. 40,354, filed May 18, 1979, now abandoned.

DISCUSSION OF THE INVENTION

The invention is directed to the making and assembling of thin-walled container halves, the walls having a thickness of between 0.006 and 0.0012 inches. Attempts at assembling such parts by conventional methods have failed in that even if one of the halves is necked in prior to attempts at assembly, the flimsy nature of the side walls prevents their retaining a cylindrical shape and thus great difficulty has been experienced in rounding the parts and then axially pushing them together.

DISCUSSION OF THE PRIOR ART

The best prior art known to applicant is French Pat. No. 1,224,793 which comprises thick-walled cylinder halves, one of which is necked out and the second necked in, the second half being telescoped into the first and the halves are then welded together. This may be effective for thick-walled containers which retain their shape after reforming, but thin-walled containers, particularly if made from relatively soft metal such as aluminum, are very unstable in retaining their shape and thus are difficult to assemble and in forming the edges, are hard to control. This is especially significant for high-speed production of 400–1000 units per minute.

SUMMARY OF THE INVENTION

This invention concerns a novel method and apparatus for assembling such thin-walled container halves.

A particular object of the invention is to provide a novel apparatus employing a die member with a central opening in which one end provides a cylindrical portion having a diameter equal to the diameter of one of the halves and terminates in a stop shoulder at the bottom thereof, said cylindrical portion merging at the upper edge thereof with the narrow end of a frustoconical pilot surface which guides the edge portion of the container half into the cylindrical portion. The opposite end of the die is formed with a frustoconical necking-in surface which at its inner end is the radially inner edge of the shoulder against which the first end portion of the container rests. The shoulder has a radial width slightly greater than the thickness of the container wall seated thereon.

The first and second halves are advanced toward each other at opposite sides of the die and the second half is forced through the necking surface and is slightly necked in while the first half is disposed in receiving position. Thus, as the second half is being necked in, it also wedges into the first half. These operations are concurrent. Before the halves are fitted one into the other, the second or entrying half has a coating of adhesive applied thereto along its entering edge, although it will be understood the adhesive may be applied within the outer (first) container half at its juncture edge portion.

An important aspect of the invention resides in holding the outer container round (squared) in the same fixture that the entering portion of the inner container is slightly necked in and relatively advancing the two halves toward each other while holding them under control so that the inner container portion easily enters the open end of the outer portion. The inner portion is under compression and after release from the die, springs outwardly and produces a hoop tension in the outer portion.

These and other objects and advantages inherent in and encompassed by the invention will become more apparent from the specification and drawings, wherein:

FIG. 1 is a side elevational view partly in axial section of apparatus incorporating the invention;

FIG. 2 is a cross-sectional view taken substantially on line 2—2 of FIG. 1;

FIG. 3 is an enlarged cross-sectional view taken substantially on line 3—3 of FIG. 1;

FIG. 4 is an enlarged fragmentary view of a portion of the die member in cross-section showing the can parts in position preparatory to entering the die; and FIG. 5 is a fragmentary axial vertical section taken substantially on line 5—5 of FIG. 3 showing the can parts in assembled position.

DESCRIPTION OF THE INVENTION

Describing the invention in detail as shown in the drawings, the apparatus 1 comprises a support frame 2 which has a plurality of vertically aligned bearings 3 and 4 mounted thereon in which an operating shaft assembly 5 is journaled.

The shaft assembly is split into two counter-rotary sections 8 and 10.

Shaft section 8 is connected to one jaw or clamp holder 12 and the shaft section 10 is connected to jaw or clamp holder 14 of a die 15. The jaw sections each carry a half section segment 16 of a die ring 17. Each section 16 has a tongue 18 fitted into a groove 20 in the associated jaw or clamp holder 12 or 14. In addition, there is provided an end stop 22 at each end of segment 16 abutting the end of the same, the stop being attached by screws 24, 24 threaded into the associated end portion of the jaw section 12 or 14. Jaws 12, 14 have arms 25, 26 respectively at one of their ends keyed by keys 27, 28 to the respective shaft sections 8 and 10.

The shaft sections 8 and 10 are connected to pistons 34, 36 of air or hydraulic motors 38, 40, the pistons operating in cylinders 42, 44.

Thus, the clamps and their associated die sections are opened and closed by reversely turning the respective shaft sections in order to admit cup-shaped container halves or cups 45, 46 which are made of metal, preferably aluminum of about 6–10 mils in thickness.

Associated delivery and discharge mechanism is used to bring the cups to the assembly apparatus 1 and to remove the assembled container but are of no concern as to the present invention.

As best seen in FIGS. 1 and 2, the assembly apparatus is provided with vacuum holders 48, 49 which are mounted on the frame and each have an arcuately shaped pocket 40 with a vacuum slot 51 connected with an associated vacuum line 53.

The holders 48, 49 releasably hold the upper and lower halves 45, 46 of the container with the open end portions 55, 56 (FIG. 4) thereof facing each other. The clamps are then closed about these open end portions as seen in the right half of FIG. 4. If desired, the clamps may first be closed and the halves advanced toward each other and entered into the upper and lower ends of the die 17. It will be noted that the upper and lower end portions 58, 60 of the dies are provided with truncated conical guide surfaces 61, 62 which flare downwardly and upwardly respectively and at their outer ends are of a diameter greater than that of the body portions 63, 64 of the upper and lower cup sections. Thus, the edge portions 55, 56 of the body portions 63, 64 are easily guided into the center portion of the die.

The center portion of the die has an upper cylindrical die portion with a surface 67 which is equal to substantially the outside diameter of the upper cup. The upper cup is advanced into the surface 63 which rounds the lower edge portion of the upper cup by an upper pusher 70 which has a cap 71 at the lower end of rod 72 of a piston which operates in an air cylinder 73 carried by the frame.

The upper cup slips along the holder 48 and is guided into the cylindrical die surface 67 until the lower edge 75 of the upper cup seats upon the shoulder 76 at the bottom of the squaring surface 67. Simultaneously, with the upper cup being inserted into the cylindrical section 67, the lower cup is pushed upwardly by an air or hydraulic cylinder 77 which has a base pod 78 bearing against the bottom or base 79 of the lower or male cup. The edge portion 56 of the lower cup has been previously coated with an appropriate adhesive 79. The edge portion 56 of the lower cup is very slightly necked-in but not deformed as it moves past the shoulder 76. The inner edge of the shoulder 76 is of a diameter slighty less than the inner diameter of the upper cup, and the shoulder 76 has a radial dimension slightly larger than the thickness of the metal of the body wall of the upper cup.

It has been found that the fit of the lower cup edge portion into the upper edge portion merely springs the metal of the lower cup very slightly without permanent deformation and that upon release from the die, the hoop compressive forces on the edge portion 56 are slightly relieved and tensile hoop stresses develop in the edge portion 55. Thus, a tight fit is insured between the two halves and the adhesive which is preferably thermoplastic polyolefin resins such as carboxylated polypropylene or polyethylene as well as thermosetting resins such as epoxy resins. These resins, when heated, will distribute and bond in shear the opposing outer surface 82 of the inner portion 56 to the inner surface 83 of the outer portion 55. It will be noted that no inner support is required to telescope the two cups into each other and no wrinkling occurs at the juncture so that a good, leak-proof bond is developed which resists separation of the two halves in shear. It will be understood that any cold adhesive or thermoplastic adhesives may be used to bond the two halves.

After the two cup halves are assembled, the die is opened and the upper and lower pushers separated and a vacuum withdrawn from the holders and the assembled unit is withdrawn or drops out and the following two halves are entered into the apparatus at opposite sides of the die and assembled in a continuous process.

Having described a preferred embodiment of the invention, it will be appreciated that various other variations will now become apparent to those skilled in the art which are comprehended within the scope of the appended claims.

I claim:

1. A method of assembling complementary metal can components including an inner and an outer component of cylindrical thin wall sections with open ends each of which normally assumes a non-round shape and each have substantially the same internal and external diameters, comprising:

axially aligning the components in opposing end to end relation;

inserting the end of one aligned component into a frusto-conical portion of a rounding die and holding the same in a cylindrical configuration;

then guiding the end of the other aligned component toward the end of the one component through another frusto-conical portion of said die which slightly compresses the same elastically sufficient to enable insertion of said end of the other component within the end of the one component in telescoping relationship therewith, then releasing the container and allowing the inner container end portion to expand radially against the outer container end portion to load the same in tension.

2. The invention according to claim 1 and applying an adhesive to either the inner side of the outer container end portion or the outer side of the inner container end portion or both, prior to telescoping them together to provide a lubricating medium therebetween, and after assembly heating the container to melt and fuse the adhesive to the respective end portions.

3. A method of assembling complementary metal can components comprising an inner and an outer component having cylindrical thin wall sections with open ends each of which normally tends to assume a non-round shape and each having substantially the same internal and external diameters, comprising:

axially aligning the components in opposing end to end relation, inserting the end of the outer component into a frusto-conical guide surface in one side of a rounding die to round the outer component and then moving the outer component into a cylindrical portion of the die to hold the outer component cylindrical in shape, coating the inner component about its open end with an adhesive, inserting the inner component with its open end into a frusto-conical guide surface in the opposite side of said die to round said inner component and to compress the same to a diameter slightly less than that of the outer component, and inserting said compressed rounded inner component into said rounded outer component utilizing the adhesive as a lubricant to facilitate the insertion, then releasing said components while assembled from said die and conditioning the adhesive to set.

4. A method of assembling complementary metal can components comprising an inner and an outer component each having a cylindrical wall section with an open end and of a thickness such that each tends to assume a non-round shape and both having substantially the same internal and external diameters, comprising:

axially aligning the components in opposing end to end relation at opposite sides of an assembly die having first and second outer frusto-conical guide surfaces flaring outwardly and an intervening cylindrical surface extending from said first of said guide surfaces to a stop overlapping the inner end of the other guide surface and providing an opening at the inner end of said other guide surface leading into said cylindrical surface, coating at least one of the components adjacent its open end on a surface opposing the other component with adhesive, inserting the outer component into said first guide surface to round same and forcing the same into said cylindrical surface against said stop, inserting the inner component into the second guide surface to round and compress same and through said opening into said outer rounded component, then releasing said components so that the inner one expands into the outer one, and then conditioning the adhesive to set.

5. The invention according to claim 4 wherein said adhesive is applied to the external side of the inner component.

6. The invention according to claim 4, wherein said inner component is only compressed radially and is not permanently deformed.

* * * * *